United States Patent
Matsuo et al.

(10) Patent No.: US 12,555,821 B2
(45) Date of Patent: Feb. 17, 2026

(54) BINDER COMPOSITION FOR SECONDARY BATTERY, SLURRY COMPOSITION FOR SECONDARY BATTERY, SOLID ELECTROLYTE-CONTAINING LAYER, ALL-SOLID-STATE SECONDARY BATTERY, AND METHOD OF PRODUCING ALL-SOLID-STATE SECONDARY BATTERY

(71) Applicant: ZEON CORPORATION, Tokyo (JP)

(72) Inventors: Yusaku Matsuo, Tokyo (JP); Kenya Sonobe, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 833 days.

(21) Appl. No.: 17/756,976

(22) PCT Filed: Nov. 26, 2020

(86) PCT No.: PCT/JP2020/044116
§ 371 (c)(1),
(2) Date: Jun. 7, 2022

(87) PCT Pub. No.: WO2021/131484
PCT Pub. Date: Jul. 1, 2021

(65) Prior Publication Data
US 2023/0033554 A1 Feb. 2, 2023

(30) Foreign Application Priority Data
Dec. 26, 2019 (JP) ................. 2019-237381

(51) Int. Cl.
*H01M 10/0562* (2010.01)
(52) U.S. Cl.
CPC ........ *H01M 10/0562* (2013.01); *H01M 2300/0082* (2013.01)
(58) Field of Classification Search
CPC .......... H01M 10/0562; H01M 2300/0082
USPC .......................................... 429/314
See application file for complete search history.

(56) References Cited

U.S. PATENT DOCUMENTS

| | | | |
|---|---|---|---|
| 8,277,977 | B2 | 10/2012 | Tsuchiya et al. |
| 10,033,042 | B2 | 7/2018 | Fukumine et al. |
| 11,532,817 | B2 | 12/2022 | Yamamoto et al. |
| 11,557,766 | B2 | 1/2023 | Maeda |
| 2007/0264571 | A1 | 11/2007 | Ryu et al. |
| 2008/0070094 | A1* | 3/2008 | Park .................. H01M 4/92 429/480 |
| 2015/0050555 | A1 | 2/2015 | Fukumine et al. |
| 2017/0054152 | A1 | 2/2017 | Yamamoto |
| 2017/0133713 | A1 | 5/2017 | Makino et al. |
| 2017/0194663 | A1* | 7/2017 | Zhamu ............ H01M 10/058 |
| 2018/0233728 | A1* | 8/2018 | Ohkubo .......... H01M 10/0525 |
| 2019/0085126 | A1* | 3/2019 | Ishihara .......... H01M 50/414 |
| 2020/0127291 | A1* | 4/2020 | Otsuka ............ H01M 10/0525 |
| 2020/0235398 | A1 | 7/2020 | Sonobe et al. |
| 2021/0167389 | A1* | 6/2021 | Maeda ................ H01M 4/622 |
| 2021/0234193 | A1 | 7/2021 | Yasuda |

FOREIGN PATENT DOCUMENTS

| | | | |
|---|---|---|---|
| CN | 101595583 A | 12/2009 | |
| CN | 104137311 A | 11/2014 | |
| CN | 105938901 A | 9/2016 | |
| CN | 110402510 A | 11/2019 | |
| JP | 2015103451 A | 6/2015 | |
| JP | 2016033917 A | 3/2016 | |
| JP | 2016162602 A * | 9/2016 | ........ H01M 10/0525 |
| JP | 2017054720 A | 3/2017 | |
| JP | 6390744 B2 | 9/2018 | |
| JP | 2018160421 A | 10/2018 | |
| KR | 1020140142694 A | 12/2014 | |
| KR | 1020150060517 A | 6/2015 | |
| WO | 2015174036 A1 | 11/2015 | |
| WO | 2016139981 A1 | 9/2016 | |
| WO | 2017199821 A1 | 11/2017 | |
| WO | 2019044452 A1 | 3/2019 | |
| WO | 2019116964 A1 | 6/2019 | |
| WO | 2019203183 A1 | 10/2019 | |

OTHER PUBLICATIONS

Dec. 11, 2024, the Extended European Search Report issued by the European Patent Office in the corresponding European Patent Application No. 20905940.1.
Feb. 9, 2021, International Search Report issued in the International Patent Application No. PCT/JP2020/044116.
Jun. 28, 2022, International Preliminary Report on Patentability issued in the International Patent Application No. PCT/JP2020/044116.

* cited by examiner

*Primary Examiner* — Allison Bourke
*Assistant Examiner* — Robert Gene West
(74) *Attorney, Agent, or Firm* — KENJA IP LAW PC

(57) ABSTRACT

A binder composition for a secondary battery contains a polymer, an organic solvent, and a compound formed of an organic material or an inorganic material. The compound has a solubility of 10 mass % or less in water at 25° C. and includes an element belonging to either or both of group 13 and group 14 of the periodic table, excluding carbon and germanium. Content of the element in the binder composition is not less than 5 mass ppm and not more than 5,000 mass ppm relative to the polymer.

10 Claims, No Drawings

BINDER COMPOSITION FOR SECONDARY BATTERY, SLURRY COMPOSITION FOR SECONDARY BATTERY, SOLID ELECTROLYTE-CONTAINING LAYER, ALL-SOLID-STATE SECONDARY BATTERY, AND METHOD OF PRODUCING ALL-SOLID-STATE SECONDARY BATTERY

TECHNICAL FIELD

The present disclosure relates to a binder composition for a secondary battery, a slurry composition for a secondary battery, a solid electrolyte-containing layer, an all-solid-state secondary battery, and a method of producing an all-solid-state secondary battery.

BACKGROUND

Secondary batteries exemplified by non-aqueous electrolyte solution secondary batteries (hereinafter, also referred to simply as "non-aqueous secondary batteries") in which an organic solvent electrolyte is used, all-solid-state secondary batteries in which a solid electrolyte is used instead of an organic solvent electrolyte, and the like have characteristics such as compact size, light weight, high energy density, and the ability to be repeatedly charged and discharged, and are used in a wide variety of applications.

A binder composition for a secondary battery that contains a polymer serving as a binder and an organic solvent may be used in the production of a battery member of a secondary battery. More specifically, the binder composition may be mixed with a component that is compounded in order to cause a battery member to display a desired function, for example, so as to produce a slurry composition for a secondary battery. Next, the organic solvent may be removed from the slurry composition for a secondary battery so as to form an electrode mixed material layer, solid electrolyte layer, or the like for a secondary battery, and then this layer may be used as a battery member or as part of a battery member.

Improvements have been made to binder compositions for secondary batteries in order to improve secondary battery performance.

For example, Patent Literature (PTL) 1 provides a binder composition for a non-aqueous secondary battery positive electrode that contains a specific polymer and an organic solvent and in which the solution turbidity of the binder composition for a non-aqueous secondary battery positive electrode is within a specific range.

As another example, PTL 2 provides a solid electrolyte composition that contains a specific inorganic solid electrolyte (A), a dehydrator (B), and a dispersion medium (C).

As yet another example, PTL 3 provides an all-solid-state secondary battery that includes a positive electrode active material layer, an inorganic solid electrolyte layer, and a negative electrode active material layer in this order and in which at least one layer among the positive electrode active material layer, the inorganic solid electrolyte layer, and the negative electrode active material layer contains a cyclic compound including at least a siloxane bond and an inorganic solid electrolyte having ion conductivity that includes a metal belonging to group 1 or 2 of the periodic table.

CITATION LIST

Patent Literature

PTL 1: JP2018-160421A
PTL 2: WO2017/199821A1
PTL 3: JP2016-33917A

SUMMARY

Technical Problem

However, the conventional binder compositions described above leave room for improvement in terms of improving water resistance of a secondary battery and causing a secondary battery to display excellent battery characteristics.

Accordingly, one object of the present disclosure is to provide a binder composition for a secondary battery that can improve water resistance of a secondary battery and can cause a secondary battery to display excellent battery characteristics.

Another object of the present disclosure is to provide a slurry composition for a secondary battery that can improve water resistance of a secondary battery and can cause a secondary battery to display excellent battery characteristics.

Yet another object of the present disclosure is to provide a solid electrolyte-containing layer that has excellent water resistance, an all-solid-state secondary battery that has excellent battery characteristics, and a method of producing this all-solid-state secondary battery.

Solution to Problem

The inventors conducted diligent investigation with the aim of solving the problems described above. The inventors made a new discovery that it is possible to improve water resistance of a secondary battery and to cause a secondary battery to display excellent battery characteristics by using a binder composition containing a polymer, an organic solvent, and a compound that is formed of an inorganic material or organic material including a specific element and having a specific property, and, in this manner, completed the present disclosure.

Specifically, the present disclosure aims to advantageously solve the problems set forth above, and a presently disclosed binder composition for a secondary battery (hereinafter, also referred to simply as a "binder composition") comprises: a polymer; an organic solvent; and a compound formed of an organic material or an inorganic material, wherein the compound has a solubility of 10 mass % or less in water at a temperature of 25° C. and includes an element belonging to either or both of group 13 and group 14 of the periodic table, excluding carbon and germanium, and content of the element in the binder composition for a secondary battery is not less than 5 mass ppm and not more than 5,000 mass ppm relative to the polymer. When a binder composition contains a polymer, an organic solvent, and a compound that has a solubility in water of not more than a specific value and that includes a specific element and when the content of the element in the binder composition is within a specific range in this manner, it is possible to improve water resistance of a secondary battery and to cause a secondary battery to display excellent battery characteristics by using this binder composition.

In the presently disclosed binder composition for a secondary battery, the polymer preferably includes one or more functional groups selected from the group consisting of a carbonyl group, an ether group, a carboxy group, and a hydroxy group. By using a polymer that includes any of the specific functional groups set forth above, it is possible to increase adhesiveness of the polymer.

In the presently disclosed binder composition for a secondary battery, the compound preferably includes one or more structures selected from the group consisting of —O—Si—O—, SiO$_2$, and —O—Al—O—. When the compound contained in the presently disclosed binder composition includes one or more structures selected from the group consisting of —O—Si—O—, SiO$_2$, and —O—Al—O—, it is possible to further improve water resistance of a secondary battery and to cause a secondary battery to display even better battery characteristics by using this binder composition.

In the presently disclosed binder composition for a secondary battery, the polymer preferably includes at least any one of a vinyl cyanide monomer unit, an aromatic monomer unit, and a conjugated diene monomer unit and/or alkylene structural unit in proportions indicated below in (i) to (iii).
(i) Vinyl cyanide monomer unit: Not less than 2 mass % and not more than 35 mass %
(ii) Aromatic monomer unit: Not less than 5 mass % and not more than 40 mass %
(iii) Conjugated diene monomer unit and/or alkylene structural unit: Not less than 20 mass % and not more than 60 mass %

When the polymer contained in the binder composition includes at least any one of a vinyl cyanide monomer unit, an aromatic monomer unit, and a conjugated diene monomer unit and/or alkylene structural unit in the proportions set forth above, it is possible to improve dispersibility of components in a slurry composition that is produced using the binder composition.

Note that the phrase "includes a monomer unit" as used in the present disclosure means that "a structural unit (repeating unit) derived from the monomer is included in a polymer obtained using that monomer". Also note that the proportional content of a "structural unit" in a polymer that is referred to in the present disclosure can be measured by a nuclear magnetic resonance (NMR) method such as $^1$H-NMR.

Moreover, the present disclosure aims to advantageously solve the problems set forth above, and a presently disclosed slurry composition for a secondary battery (hereinafter, also referred to simply as a "slurry composition") comprises any one of the binder compositions for a secondary battery set forth above. By using a slurry composition that contains any one of the binder compositions set forth above, it is possible to improve water resistance of a secondary battery and to cause a secondary battery to display excellent battery characteristics.

The presently disclosed slurry composition for a secondary battery preferably comprises a solid electrolyte. By using a slurry composition that contains a solid electrolyte, it is possible to improve water resistance of an all-solid-state secondary battery and to cause an all-solid-state secondary battery to display excellent battery characteristics.

Furthermore, the present disclosure aims to advantageously solve the problems set forth above, and a presently disclosed solid electrolyte-containing layer is obtained using the solid electrolyte-containing slurry composition set forth above. By forming a solid electrolyte-containing layer using the presently disclosed slurry composition containing a solid electrolyte, it is possible to form a solid electrolyte-containing layer that is easy to densify.

Also, the present disclosure aims to advantageously solve the problems set forth above, and a presently disclosed all-solid-state secondary battery comprises the solid electrolyte-containing layer set forth above. An all-solid-state secondary battery that includes the presently disclosed solid electrolyte-containing layer has excellent water resistance and can display excellent battery characteristics.

Moreover, the present disclosure aims to advantageously solve the problems set forth above, and a presently disclosed method of producing an all-solid-state secondary battery comprises a step of pressing the solid electrolyte-containing layer set forth above with a pressure of less than 300 MPa. The presently disclosed production method enables production of an all-solid-state secondary battery that has excellent water resistance and can display excellent battery characteristics.

Advantageous Effect

According to the present disclosure, it is possible to provide a binder composition for a secondary battery that can improve water resistance of a secondary battery and can cause a secondary battery to display excellent battery characteristics.

Moreover, according to the present disclosure, it is possible to provide a slurry composition for a secondary battery that can improve water resistance of a secondary battery and can cause a secondary battery to display excellent battery characteristics.

Furthermore, according to the present disclosure, it is possible to provide a solid electrolyte-containing layer that has excellent water resistance, an all-solid-state secondary battery that has excellent battery characteristics, and a method of producing this all-solid-state secondary battery.

DETAILED DESCRIPTION

The following provides a detailed description of embodiments of the present disclosure.

The presently disclosed binder composition for a secondary battery and slurry composition for a secondary battery may be used in production of a secondary battery such as a non-aqueous secondary battery or an all-solid-state secondary battery. Moreover, the presently disclosed binder composition for a secondary battery may be used in production of the presently disclosed slurry composition for a secondary battery. Furthermore, the presently disclosed slurry composition for a secondary battery may be used in formation of a solid electrolyte-containing layer, such as an electrode mixed material layer or solid electrolyte layer, that is used in an all-solid-state secondary battery, for example. The presently disclosed solid electrolyte-containing layer is formed using the presently disclosed slurry composition for a secondary battery. Moreover, the presently disclosed all-solid-state secondary battery includes the presently disclosed solid electrolyte-containing layer. Furthermore, the presently disclosed all-solid-state secondary battery can be produced through the presently disclosed method of producing an all-solid-state secondary battery.

(Binder Composition for Secondary Battery)

The presently disclosed binder composition contains a polymer, an organic solvent, and a compound formed of an organic material or an inorganic material, and can optionally further contain other components. Features of the presently disclosed binder composition are that the compound has a solubility of 10 mass % or less in water at a temperature of 25° C., that the compound includes an element belonging to either or both of group 13 and group 14 of the periodic table (excluding carbon and germanium), and that the content of the element in the binder composition is not less than 5 mass ppm and not more than 5,000 mass ppm relative to the polymer.

<Polymer>

Any polymer that is typically used as a binder in secondary batteries can be used as the polymer that is contained in the presently disclosed binder composition. Of such polymers, it is preferable to use a polymer that includes one or more functional groups selected from the group consisting of a carbonyl group, an ether group, a carboxy group, and a hydroxy group as the polymer. By using a polymer that includes any of the functional groups set forth above, it is possible to increase adhesiveness of the polymer.

The polymer including any of the functional groups set forth above is obtained by, for example, introducing any of the functional groups set forth above into a polymer. The method by which any of the functional groups set forth above is introduced into a polymer is not specifically limited and may be by producing a polymer using a monomer that includes any of the functional groups set forth above or by end modifying any polymer so as to obtain a polymer having any of the functional groups set forth above at an end thereof, for example.

[Polymer Including Carbonyl Group]

A polymer including a carbonyl group may be obtained through polymerization of a monomer composition that contains a carbonyl group-containing monomer. The carbonyl group-containing monomer may be a (meth)acrylic acid ester monomer. In the present specification, "(meth)acryl" is used to indicate "acryl" and/or "methacryl".

Examples of (meth)acrylic acid ester monomers include acrylic acid alkyl esters such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate.

Other examples of carbonyl group-containing monomers include esters of polybasic carboxylic acids such as methyl allyl maleate, diphenyl maleate, nonyl maleate, decyl maleate, dodecyl maleate, octadecyl maleate, fluoroalkyl maleates, monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, and dibutyl itaconate. One of these carbonyl group-containing monomers may be used individually, or two or more of these carbonyl group-containing monomers may be used in combination.

The proportional content of a carbonyl group-containing monomer unit derived from a carbonyl group-containing monomer in the polymer when all repeating units (total of monomer units and structural units) in the polymer are taken to be 100 mass % is preferably 25 mass % or more, more preferably 30 mass % or more, and even more preferably 35 mass % or more, and is preferably 95 mass % or less, more preferably 90 mass % or less, and even more preferably 85 mass % or less. When the proportional content of a carbonyl group-containing monomer unit in the polymer is 25 mass % or more, close adherence strength of an electrode mixed material layer and a current collector can be increased through a slurry composition that is produced using the presently disclosed binder composition. Moreover, when the proportional content of a carbonyl group-containing monomer unit in the polymer is 95 mass % or less, dispersibility of an electrode active material and/or conductive additive can be improved in a slurry composition that is produced using the presently disclosed binder composition.

[Polymer Including Ether Group]

A polymer including an ether group may be obtained through polymerization of a monomer composition that contains an ether group-containing monomer. Examples of ether group-containing monomers include phenoxyethyl acrylate, ethoxylated o-phenylphenol (meth)acrylate, phenoxypolyethylene glycol (meth)acrylate, allyl glycidyl ether, glycerin monoallyl ether, 4-hydroxybutyl acrylate glycidyl ether, and methoxypolyethylene glycol (meth)acrylate.

The proportional content of an ether group-containing monomer unit derived from an ether group-containing monomer in the polymer when all repeating units in the polymer are taken to be 100 mass % is preferably 5 mass % or more, more preferably 7.5 mass % or more, and even more preferably 10 mass % or more, and is preferably 50 mass % or less, and more preferably 40 mass % or less. When the proportional content of an ether group-containing monomer unit in the polymer is 5 mass % or more, close adherence strength of an electrode mixed material layer and a current collector can be increased. Moreover, when the proportional content of an ether group-containing monomer unit in the polymer is 50 mass % or less, dispersibility of an electrode active material and/or conductive additive can be improved in a slurry composition that is produced using the presently disclosed binder composition.

[Polymer Including Carboxy Group]

A polymer including a carboxy group may be obtained through polymerization of a monomer composition that contains a carboxy-containing monomer. The carboxy group-containing monomer may be an ethylenically unsaturated carboxylic acid compound, examples of which include carboxylic acid monomers such as acrylic acid, methacrylic acid, ethacrylic acid (2-ethylacrylic acid), itaconic acid, maleic acid, fumaric acid, and citraconic acid; and butenedioic acid monoalkyl ester monomers such as monomethyl maleate, monoethyl maleate, mono-n-butyl maleate, monomethyl fumarate, monoethyl fumarate, and mono-n-butyl fumarate. One of these carboxy group-containing monomers may be used individually, or two or more of these carboxy group-containing monomers may be used in combination.

The proportional content of a carboxy group-containing monomer unit derived from a carboxy group monomer in the polymer when all repeating units in the polymer are taken to be 100 mass % is preferably 1 mass % or more, more preferably 1.5 mass % or more, and even more preferably 2 mass % or more, and is preferably 10 mass % or less, and more preferably 8 mass % or less. When the proportional content of a carboxy group-containing monomer unit in the polymer is 1 mass % or more, close adherence strength of an electrode mixed material layer and a current collector can be increased. Moreover, when the proportional content of a carboxy group-containing monomer unit in the polymer is 10 mass % or less, a solid electrolyte-containing layer that can display excellent ion conductivity can be formed through a slurry composition that is produced using the presently disclosed binder composition.

[Polymer Including Hydroxy Group]

A polymer including a hydroxy group may be obtained through polymerization of a monomer composition that contains a hydroxy group-containing monomer. Examples of hydroxy group-containing monomers include 2-hydroxyethyl acrylate and hydroxyethyl acrylamide.

The proportional content of a hydroxy group-containing monomer unit derived from a hydroxy group-containing monomer in the polymer when all repeating units in the polymer are taken to be 100 mass % is preferably 1 mass % or more, more preferably 1.5 mass % or more, and even more preferably 2 mass % or more, and is preferably 10 mass % or less, and more preferably 8 mass % or less. When the proportional content of a hydroxy group-containing monomer unit in the polymer is 1 mass % or more, close adherence strength of an electrode mixed material layer and a current collector can be increased. Moreover, when the proportional content of a hydroxy group-containing monomer unit in the polymer is 10 mass % or less, a solid electrolyte-containing layer that can display excellent ion conductivity can be formed through a slurry composition that is produced using the presently disclosed binder composition.

The polymer contained in the presently disclosed binder composition can include monomer units such as a vinyl cyanide monomer unit, an aromatic monomer unit, a conjugated diene monomer unit and/or alkylene structural unit, and so forth, for example.

[Vinyl Cyanide Monomer Unit]

Examples of vinyl cyanide monomers that can form a vinyl cyanide monomer unit include acrylonitrile, methacrylonitrile, a-chloroacrylonitrile, and α-ethylacrylonitrile. One of these vinyl cyanide monomers may be used individually, or two or more of these vinyl cyanide monomers may be used in combination. Of these vinyl cyanide monomers, acrylonitrile is preferable.

The proportional content of a vinyl cyanide monomer unit in the polymer when all repeating units in the polymer are taken to be 100 mass % is preferably 2 mass % or more, more preferably 3 mass % or more, and even more preferably 4 mass % or more, and is preferably 35 mass % or less, more preferably 28 mass % or less, and even more preferably 26 mass % or less. When the proportional content of a vinyl cyanide monomer unit in the polymer is 2 mass % or more, a solid electrolyte-containing layer in which a solid electrolyte is well dispersed can be formed through a slurry composition that is produced using the presently disclosed binder composition. Moreover, when the proportional content of a vinyl cyanide monomer unit in the polymer is 35 mass % or less, solubility of the polymer in organic solvents can be improved. This makes it possible to improve dispersibility of components contained in a slurry composition that is produced using the binder composition.

[Aromatic Monomer Unit]

Examples of aromatic monomers that can form an aromatic monomer unit include styrene, styrene sulfonic acid and salts thereof, α-methylstyrene, p-t-butylstyrene, butoxystyrene, vinyltoluene, chlorostyrene, vinylnaphthalene, and phenoxyethyl acrylate. One of these aromatic monomers may be used individually, or two or more of these aromatic monomers may be used in combination. Of these aromatic monomers, styrene is preferable.

The proportional content of an aromatic monomer unit in the polymer when all repeating units in the polymer are taken to be 100 mass % is preferably 5 mass % or more, more preferably 7 mass % or more, and even more preferably 10 mass % or more, and is preferably 40 mass % or less, more preferably 35 mass % or less, and even more preferably 30 mass % or less. When the proportional content of an aromatic monomer unit in the polymer is 5 mass % or more, dispersibility of an electrode active material and/or conductive additive can be increased through a slurry composition that is produced using the presently disclosed binder composition. Moreover, when the proportional content of an aromatic monomer unit in the polymer is 40 mass % or less, close adherence strength of an electrode mixed material layer and a current collector can be increased through a slurry composition that is produced using the presently disclosed binder composition. Furthermore, a solid electrolyte-containing layer in which a solid electrolyte is well dispersed can be formed by using this slurry composition.

[Conjugated Diene Monomer Unit]

Examples of conjugated diene monomers that can form a conjugated diene monomer unit include aliphatic conjugated diene monomers such as 1,3-butadiene, 2-methyl-1,3-butadiene (hereinafter, referred to as "isoprene"), 2,3-dimethyl-1,3-butadiene, 2-chloro-1,3-butadiene, substituted linear conjugated pentadienes, and substituted and branched conjugated hexadienes. One of these conjugated diene monomers may be used individually, or two or more of these conjugated diene monomers may be used in combination.

Note that the term "diene monomer unit" as used in the present disclosure is also inclusive of a structural unit (hydrogenated unit) obtained through hydrogenation of a monomer unit included in a polymer that has been obtained using a diene monomer.

[Alkylene Structural Unit]

An alkylene structural unit is a repeating unit that is composed of only an alkylene structure represented by a general formula:

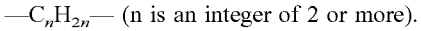

—$C_nH_{2n}$— (n is an integer of 2 or more).

Although the alkylene structural unit may be linear or branched, the alkylene structural unit is preferably linear (i.e., is preferably a linear alkylene structural unit). Moreover, the carbon number of the alkylene structural unit is preferably 4 or more (i.e., n in the preceding general formula is preferably an integer of 4 or more).

Although no specific limitations are placed on the method by which an alkylene structural unit is introduced into the polymer, methods (1) and (2) described below may be used, for example.

(1) A method in which a polymer is produced from a monomer composition containing a conjugated diene monomer and then the polymer is hydrogenated so as to convert a conjugated diene monomer unit to an alkylene structural unit (2) A method in which a polymer is produced from a monomer composition containing a 1-olefin monomer Of these methods, method (1) is preferable in terms of ease of production of the polymer.

In other words, the alkylene structural unit is preferably a structural unit obtained through hydrogenation of a conjugated diene monomer unit (i.e., the alkylene structural unit is preferably a hydrogenated conjugated diene unit), and is more preferably a structural unit obtained through hydrogenation of a 1,3-butadiene unit (i.e., the alkylene structural unit is more preferably a hydrogenated 1,3-butadiene unit).

Examples of the 1-olefin monomer include ethylene, propylene, 1-butene, and 1-hexene. One of these 1-olefin monomers may be used individually, or two or more of these 1-olefin monomers may be used in combination.

The proportional content of a conjugated diene monomer unit and/or alkylene structural unit in the polymer when all repeating units in the polymer are taken to be 100 mass % is preferably 20 mass % or more, more preferably 25 mass % or more, and even more preferably 30 mass % or more, and is preferably 60 mass % or less, more preferably 55 mass % or less, and even more preferably 50 mass % or less. Note that in a case in which the polymer includes both a conjugated diene monomer unit and an alkylene structural unit, the total of the conjugated diene monomer unit and the alkylene structural unit is preferably within any of the ranges set forth above. When the proportional content of the conjugated diene monomer unit and/or alkylene structural unit in the polymer is 20 mass % or more, dispersibility of an electrode active material and/or a conductive additive can be increased through a slurry composition that is produced using the presently disclosed binder composition. Moreover, when the proportional content of a conjugated diene monomer unit and/or alkylene structural unit in the polymer is 60 mass % or less, close adherence strength of an electrode mixed material layer and a current collector can be increased through a slurry composition that is produced using the presently disclosed binder composition. Furthermore, a solid electrolyte-containing layer in which a solid electrolyte is well dispersed can be formed by using this slurry composition.

[Other Monomer Units]

The polymer contained in the presently disclosed binder composition may further include other monomer units besides those of the monomers described above. Examples of other monomers that can form such other monomer units include, but are not specifically limited to, cross-linkable monomers (for example, allyl methacrylate and ethylene dimethacrylate).

<<Production Method of Polymer>>

No specific limitations are placed on the method by which the polymer contained in the presently disclosed binder composition is produced. For example, the polymer can be produced by polymerizing a monomer composition that contains the monomers described above and then optionally performing hydrogenation.

Note that the proportional content of each monomer in the monomer composition can be set in accordance with the proportional content of each monomer unit and structural unit in the polymer.

The method of polymerization is not specifically limited and can be any of solution polymerization, suspension polymerization, bulk polymerization, and emulsion polymerization. A known emulsifier or polymerization initiator may be used in these polymerization methods as necessary.

The method of hydrogenation is also not specifically limited, and a typical method using a catalyst (for example, refer to WO2012/165120A1, WO2013/080989A1, and JP2013-8485A) can be adopted.

<Organic Solvent>

The organic solvent contained in the presently disclosed binder composition can be selected as appropriate depending on the use of the binder composition without any specific limitations. Examples of organic solvents that may be used include aromatic hydrocarbons such as toluene, xylene, and mesitylene; ketones such as ethyl methyl ketone, cyclohexanone, and diisobutyl ketone; esters such as ethyl acetate, butyl acetate, butyl butyrate, hexyl butyrate, isobutyl isobutyrate, γ-butyrolactone, and c-caprolactone; and ethers such as tetrahydrofuran, ethylene glycol diethyl ether, and n-butyl ether. One of these organic solvents may be used individually, or two or more of these organic solvents may be used in combination.

In a case in which the presently disclosed binder is to be used to produce a slurry composition for an all-solid-state secondary battery, for example, the organic solvent is preferably xylene, mesitylene, diisobutyl ketone, butyl butyrate, hexyl butyrate, or n-butyl ether from a viewpoint of increasing dispersibility of a solid electrolyte while also inhibiting degradation caused by side reactions, and is more preferably xylene, mesitylene, or diisobutyl ketone.

<Compound Formed of Organic Material or Inorganic Material>

The compound formed of an organic material or an inorganic material that is contained in the presently disclosed binder composition is a compound that has a solubility of 10 mass % or less in water at a temperature of 25° C. and that includes an element belonging to either or both of group 13 and group 14 of the periodic table. However, among elements belonging to group 13 and group 14 of the periodic table, carbon and germanium are excluded in the present disclosure.

The compound contained in the presently disclosed binder composition preferably includes one or more structures selected from the group consisting of —O—Si—O—, $SiO_2$, and —O—Al—O—, and more preferably includes at least one structure among —O—Si—O— and —Al-0—. When the compound includes any structure among —0—Si—O—, $SiO_2$, and —Al-0—, a secondary battery having improved water resistance can be produced by using the presently disclosed binder composition.

The compound including one or more structures selected from the group consisting of —O—Si—O—, $SiO_2$, and —O—Al—O— may be a zeolite, silica gel, polydimethylsiloxane, or the like, for example. One of these compounds may be used individually, or two or more of these compounds may be used in combination. Of these compounds, zeolites, silica gel, and polydimethylsiloxane are preferable as the compound from a viewpoint of enhancing water resistance and cycle characteristics of a secondary battery.

<Other Components>

No specific limitations are placed on other components that can optionally be contained in the presently disclosed binder composition. Examples of such other components include binders other than the polymer described above, dispersants, leveling agents, defoamers, and reinforcing materials. These other components are not specifically limited so long as they do not influence battery reactions. Moreover, one of these other components may be used individually, or two or more of these other components may be used in combination in a freely selected ratio.

<Properties of Binder Composition for Secondary Battery>

The presently disclosed binder composition is required to contain at least the polymer, organic solvent, and compound described above and to have a content of the element described above, in the binder composition, of not less than 5 mass ppm and not more than 5,000 mass ppm relative to the polymer. This makes it possible to improve water resistance of a secondary battery and to cause a secondary battery to display excellent battery characteristics by using the presently disclosed binder composition.

The content of the above-described element in the presently disclosed binder composition is preferably 10 mass ppm or more, more preferably 20 mass ppm or more, and even more preferably 500 mass ppm or more relative to the polymer, and is preferably 4,000 mass ppm or less, more preferably 3,500 mass ppm or less, even more preferably 3,000 mass ppm or less, and particularly preferably 2,000 mass ppm or less relative to the polymer. When the content of the above-described element in the binder composition is 10 mass ppm or more relative to the polymer, degradation caused by side reactions can be inhibited. Moreover, when the content of the above-described element is 3,500 mass ppm or less relative to the polymer, aggregation of components can be inhibited in a slurry composition that is produced using the presently disclosed binder composition, and slurry characteristics can be improved. Furthermore, when the content of the above-described element is 3,000 mass ppm or less relative to the polymer, increased cell resistance of a secondary battery can be sufficiently suppressed.

<Production Method of Binder Composition for Secondary Battery>

No specific limitations are placed on the method by which the presently disclosed binder composition is produced. For example, the presently disclosed binder composition can be produced by mixing, in the organic solvent, the above-described polymer, compound, and other components that are used as necessary. No specific limitations are placed on the mixing method used in this mixing, and the mixing can be performed using a typically used stirrer or disperser.

(Slurry Composition for Secondary Battery)

The presently disclosed slurry composition for a secondary battery is a composition that contains at least the presently disclosed binder composition for a secondary battery set forth above. In more detail, the presently disclosed slurry composition contains at least the above-described polymer, organic solvent, and compound and can optionally contain other components. As a result of the presently disclosed slurry composition containing the binder composition set forth above, it is possible to improve water resistance of a secondary battery and to cause a secondary battery to display excellent battery characteristics by using this slurry composition.

The presently disclosed slurry composition may contain a solid electrolyte as another component such as mentioned above. When the slurry composition contains a solid electrolyte, it is possible to form a solid electrolyte-containing layer having excellent water resistance by using this slurry composition.

<Production Method of Slurry Composition for Secondary Battery>

No specific limitations are placed on the method by which the presently disclosed slurry composition is produced. For example, the presently disclosed slurry composition can be produced by mixing the binder composition with other optional components such as a solid electrolyte using any mixing means.

<Solid Electrolyte>

The solid electrolyte that can optionally be contained in the presently disclosed slurry composition is not specifically limited so long as it is particles formed of a solid that displays ion conductivity and may, for example, be an inorganic solid electrolyte.

The inorganic solid electrolyte may be a crystalline inorganic ion conductor, an amorphous inorganic ion conductor, or a mixture thereof without any specific limitations. In a case in which a solid electrolyte-containing layer formed using the presently disclosed slurry composition is to be used in an all-solid-state lithium ion secondary battery, a crystalline inorganic lithium ion conductor, an amorphous inorganic lithium ion conductor, or a mixture thereof can normally be used as the inorganic solid electrolyte. In particular, it is preferable that the inorganic solid electrolyte includes either or both of a sulfide inorganic solid electrolyte and an oxide inorganic solid electrolyte from a viewpoint of forming a solid electrolyte-containing layer having even better ion conductivity.

Examples of crystalline inorganic lithium ion conductors include $Li_3N$, LISICON ($Li_{14}Zn(GeO_4)_4$), perovskite-type lithium ion conductors (for example, $Li_{0.5}La_{0.5}TiO_3$), garnet-type lithium ion conductors (for example, $Li_7La_3Zr_2O_{12}$), LIPON ($Li_{3+y}PO_{4-x}N_x$), and Thio-LISICON ($Li_{3.25}Ge_{0.25}P_{0.75}S_4$).

The amorphous inorganic lithium ion conductor is not specifically limited so long as it is a material (sulfide solid electrolyte material) that includes S (sulfur atoms) and displays ion conductivity. In a case in which the presently disclosed slurry composition is to be used for a solid-state lithium secondary battery, the sulfide solid electrolyte material may be a material obtained using a raw material composition containing $Li_2S$ and a sulfide of an element belonging to any one of groups 13 to 15. The method by which the sulfide solid electrolyte material is synthesized using such a raw material composition may be an amorphization method, for example. Examples of amorphization methods that may be used include mechanical milling and melt quenching, of which, mechanical milling is preferable. This is because mechanical milling enables treatment at normal temperature and also allows simplification of production steps.

The element belonging to any one of groups 13 to 15 may be Al, Si, Ge, P, As, Sb, or the like, for example. Moreover, the sulfide of the element belonging to any one of groups 13 to 15 may, more specifically, be $Al_2S_3$, $SiS_2$, $GeS_2$, $P_2S_3$, $P_2S_5$, $As_2S_3$, $Sb_2S_3$ or the like.

Of these sulfides, a sulfide of group 14 or 15 is preferably used. In particular, the sulfide solid electrolyte material obtained using a raw material composition containing $Li_2S$ and a sulfide of an element belonging to any one of groups 13 to 15 is preferably a $Li_2S$—$P_2S_5$ material, a $Li_2S$—$SiS_2$ material, a $Li_2S$—$GeS_2$ material, or a $Li_2S$—$Al_2S_3$ material, and more preferably a $Li_2S$—$P_2S_5$ material. This is because these materials have excellent Li ion conductivity.

Note that one of the crystalline inorganic lithium ion conductors described above may be used individually, or two or more of the crystalline inorganic lithium ion conductors described above may be used in combination. Moreover, the particle diameter of the solid electrolyte can be the same as the particle diameter of a conventionally used solid electrolyte without any specific limitations.

(Solid Electrolyte-Containing Layer) The presently disclosed solid electrolyte-containing layer (hereinafter, also referred to simply as "the solid electrolyte-containing layer") is a layer that is obtained using the presently disclosed slurry composition. Moreover, the slurry composition that is used to form the presently disclosed solid electrolyte-containing layer is a composition that at least contains a solid electrolyte. The presently disclosed solid electrolyte-containing layer can be used as an electrode mixed material layer (positive electrode mixed material layer or negative electrode mixed material layer) that gives and receives electrons through electrochemical reaction or a solid electrolyte-containing layer that is disposed between a positive electrode mixed material layer and a negative electrode mixed material layer that are in opposition to each other, for example, without any specific limitations.

No specific limitations are placed on the method by which the presently disclosed solid electrolyte-containing layer is formed. For example, the presently disclosed solid electrolyte-containing layer can be formed by applying the presently disclosed slurry composition containing the above-described solid electrolyte onto the surface of a suitable substrate to form a coating film and subsequently drying the coating film that is formed. In other words, the presently disclosed solid electrolyte-containing layer is formed of a dried product of the presently disclosed slurry composition containing the above-described solid electrolyte and normally contains at least a solid electrolyte, a polymer, and a compound including an element belonging to either or both of group 13 and group 14 of the periodic table. Note that components contained in the solid electrolyte-containing layer are components that were contained in the above-described slurry composition, and the content ratio of these components is normally the same as the content ratio thereof in the slurry composition.

The content of the solid electrolyte in the solid electrolyte-containing layer is 10 mass % or more, for example, and can be set as 100 mass % or less. The thickness of the solid electrolyte-containing layer can be set as not less than 1 μm and not more than 500 μm, for example.

The presently disclosed solid electrolyte-containing layer has excellent water resistance as a result of being formed from the presently disclosed slurry composition. Moreover, by using the presently disclosed solid electrolyte-containing layer as an electrode mixed material layer, it is possible to sufficiently densify the electrode mixed material layer even when a pressing process thereof is performed with a pressure (pressing pressure) of less than 300 MPa, for example.

(All-Solid-State Secondary Battery)

The presently disclosed all-solid-state secondary battery includes the presently disclosed solid electrolyte-containing layer set forth above. For example, the presently disclosed all-solid-state secondary battery may include a positive electrode, a solid electrolyte layer, and a negative electrode, and may have the presently disclosed solid electrolyte-containing layer as at least one of a positive electrode mixed material layer of the positive electrode, a negative electrode mixed material layer of the negative electrode, and the solid electrolyte layer.

The presently disclosed all-solid-state secondary battery has excellent water resistance while also having excellent battery characteristics as a result of including the presently disclosed solid electrolyte-containing layer.

Note that any electrode for an all-solid-state secondary battery can be used in the presently disclosed all-solid-state secondary battery as an electrode for an all-solid-state secondary battery including an electrode mixed material layer that does not correspond to the presently disclosed solid electrolyte-containing layer without any specific limitations so long as it includes an electrode mixed material layer that does not correspond to the presently disclosed solid electrolyte-containing layer.

Moreover, any solid electrolyte layer such as a solid electrolyte layer described in JP2012-243476A, JP2013-143299A, JP2016-143614A, or the like can be used without any specific limitations in the presently disclosed all-solid-state secondary battery as a solid electrolyte layer that does not correspond to the presently disclosed solid electrolyte-containing layer.

The presently disclosed all-solid-state secondary battery can be obtained by stacking the positive electrode and the negative electrode such that the positive electrode mixed material layer of the positive electrode and the negative electrode mixed material layer of the negative electrode are in opposition via the solid electrolyte layer, optionally performing pressing to obtain a laminate, subsequently placing the laminate in a battery container in that form or after rolling, folding, or the like in accordance with the battery shape, and then sealing the battery container. Note that an expanded metal, an overcurrent preventing device such as a fuse or a PTC device, a lead plate, or the like may be placed in the battery container as necessary in order to prevent pressure increase inside the battery and occurrence of overcharging or overdischarging. The shape of the battery may be a coin type, button type, sheet type, cylinder type, prismatic type, flat type, or the like.

(Method of Producing all-Solid-State Secondary Battery)

The presently disclosed method of producing an all-solid-state secondary battery includes a step of pressing the presently disclosed solid electrolyte-containing layer set forth above with a pressure of less than 300 MPa (pressing step) and can optionally include, prior to the pressing step, a step of applying the presently disclosed slurry composition onto a substrate (application step) and a step of drying the slurry composition that has been applied onto the substrate so as to form a solid electrolyte-containing layer (solid electrolyte-containing layer formation step). Although the following describes the method of producing an all-solid-state secondary battery for a case in which the presently disclosed solid electrolyte-containing layer is used as an electrode mixed material layer of the secondary battery, no specific limitations are placed on the presently disclosed method of producing an all-solid-state secondary battery so long as it includes at least the above-described pressing step.

<Application Step>

In the application step, the slurry composition is applied onto a substrate. No specific limitations are placed on the method by which the slurry composition is applied onto the substrate. For example, a method such as doctor blading, reverse roll coating, direct roll coating, gravure coating, extrusion coating, or brush coating may be adopted.

<Solid Electrolyte-Containing Layer Formation Step>

In the solid electrolyte-containing layer formation step, the slurry composition on the substrate is dried. The method by which the slurry composition on the substrate is dried is not specifically limited and may be a commonly known method. Examples of drying methods that may be used include drying by warm, hot, or low-humidity air, drying in a vacuum, and drying by irradiation with infrared light, electron beams, or the like.

<Pressing Step>

In the pressing step, the solid electrolyte-containing layer is subjected to a pressing process with a pressing pressure of less than 300 MPa. The pressing process can be performed by roll pressing or the like without any specific limitations. In a case in which the solid electrolyte-containing layer that functions as an electrode mixed material layer is formed in the presently disclosed method of producing an all-solid-state secondary battery, it is possible to sufficiently densify the electrode mixed material layer even when the pressing process of the solid electrolyte-containing layer is performed with a low pressing pressure of less than 300 MPa.

Examples

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer.

Furthermore, in the examples and comparative examples, the following methods were used to measure or evaluate the content of an element belonging to either or both of group 13 and group 14 of the periodic table relative to a polymer in a binder composition, dispersibility, ion conductivity, peel strength of a positive electrode, cell resistance, pressability, and cell characteristics (cycle characteristics). In addition, the solubility in water of compounds used in the examples and comparative examples was measured by a method described below.

<Content of Element Belonging to Group 13 and/or 14 of Periodic Table>

Approximately 1 g of a binder composition was heated in an electric furnace having a temperature of 550° C. for approximately 3 hours so as to incinerate the binder composition. Subsequently, approximately 5 mL of concentrated sulfuric acid was added to the incinerated binder composition, dissolution was performed, and then approximately 5 mL of concentrated nitric acid was gradually added in order to perform wet decomposition. After this decomposition, the acid was concentrated, was made up to a volume of 10 mL with ultrapure water, and then the metal ion concentration in the binder composition was measured using an ICP-AES apparatus (produced by SII NanoTechnology Inc.; model no.: SPS-5100). Based on an obtained value for the metal ion concentration, the content of an element belonging to either or both of group 13 and group 14 of the periodic table (excluding carbon and germanium) relative to a polymer in the binder composition was calculated.

<Dispersibility>

The viscosity of a slurry composition for a solid electrolyte layer was measured by a Brookfield B-type viscometer at 60 rpm (temperature: 25° C.) and was evaluated by the following standard. A smaller viscosity for the slurry composition for a solid electrolyte layer indicates better dispersion of a solid electrolyte contained in the slurry composition for a solid electrolyte layer.

A: Viscosity of less than 3,000 mPa·s
B: Viscosity of not less than 3,000 mPa·s and less than 5,000 mPa·s
C: Viscosity of not less than 5,000 mPa·s and less than 8,000 mPa·s
D: Viscosity of not less than 8,000 mPa·s or not dispersed (no fluidity)

<Ion Conductivity>

A slurry composition for a solid electrolyte layer was dried by a hot plate having a temperature of 130° C. inside a glovebox (moisture content: 1 ppm or less), and the resultant powder was shaped into a circular tube shape of 10 mm in diameter and 1 mm in thickness to obtain a measurement sample. Measurement of lithium ion conductivity (temperature: 25° C.) for the measurement sample was performed by the alternating current impedance method. This measurement was performed using a frequency response analyzer (produced by Solartron Analytical; product name: Solartron® 1260 (Solartron is a registered trademark in Japan, other countries, or both)) under measurement conditions of an applied voltage of 10 mV and a measurement frequency range of 0.01 MHz to 1 MHz. The obtained lithium ion conductivity was taken to be S0.

Separately to the above, the slurry composition for a solid electrolyte layer was dried by a hot plate having a temperature of 130° C. inside a dry room (moisture content: 127 ppm or less; equivalent to dew point of −40° C.), and the resultant powder was shaped into a circular tube shape of 10 mm in diameter and 0.5 mm in thickness to obtain a measurement sample. Lithium ion conductivity (temperature: 25° C.) was measured for this measurement sample in the same way as for S0 described above. The obtained lithium ion conductivity was taken to be S1.

The conductivity maintenance rate $(=S_{1/50\times100}(\%))$ was determined and was evaluated by the following standard. A larger conductivity maintenance rate can be said to mean that degradation of the solid electrolyte by moisture is inhibited and that water resistance is excellent. Moreover, a solid electrolyte layer (solid electrolyte-containing layer) formed using the slurry composition for a solid electrolyte layer displays better ion conductivity when the conductivity maintenance rate is larger.

A: Conductivity maintenance rate of 95% or more
B: Conductivity maintenance rate of not less than 85% and less than 95%
C: Conductivity maintenance rate of not less than 60% and less than 85%
D: Conductivity maintenance rate of less than 60%

<Peel Strength of Positive Electrode>

A rectangle of 1.0 cm in width by 10 cm in length was cut out from a positive electrode as a test specimen. Cellophane tape (tape prescribed by JIS Z1522) was affixed to the surface at the positive electrode mixed material layer-side of the test specimen, the cellophane tape was subsequently peeled off in a direction at 180° from one end of the test specimen at a speed of 50 mm/min, and the stress during this peeling was measured. A total of three measurements were made in this manner. An average value of these measurements was determined, was taken to be the peel strength (N/m) of the positive electrode, and was evaluated by the following standard. A larger positive electrode peel strength indicates better adhesiveness of the positive electrode mixed material layer and stronger close adherence with the current collector.

A+: Peel strength of 4 N/m or more
A: Peel strength of not less than 3 N/m and less than 4 N/m
B: Peel strength of not less than 2 N/m and less than 3 N/m
C: Peel strength of not less than 1 N/m and less than 2 N/m
D: Peel strength of less than 1 N/m <Cell Resistance>

Three all-solid-state secondary battery cells were charged to 4.2 V by a 0.1C constant-current method, were subsequently discharged to 3.0 V at 0.1C, and the 0.1C discharge capacity was determined. Next, charging was performed to 4.2 V at 0.1C, discharging was subsequently performed to 3.0 V at 2C, and the 2C discharge capacity was determined. An average value of the 0.1C discharge capacity for the three cells was taken to be discharge capacity (a) and an average value of the 2C discharge capacity for the three cells was taken to be discharge capacity (b). A ratio (capacity ratio) of the discharge capacity (b) relative to the discharge capacity (a) was calculated (=discharge capacity (b)/discharge capacity (a)×100(%)) and was evaluated by the following standard. A larger value for the capacity ratio indicates lower cell resistance.

A: Capacity ratio of 90% or more
B: Capacity ratio of not less than 80% and less than 90%
C: Capacity ratio of not less than 60% and less than 80%
D: Capacity ratio of less than 60%

<Pressability>

A produced positive electrode was punched out with a diameter of 10 mm and was pressed with a specific pressure for 2 minutes using a uniaxial pressing machine. The pressing pressure (MPa) with which a target density of 3.3 g/cm$^3$ was reached was measured and was evaluated by the following standard. A smaller pressing pressure indicates better pressability.

A: Less than 200 MPa
B: Not less than 200 MPa and less than 300 MPa
C: Not less than 300 MPa and less than 400 MPa
D: 400 MPa or more <Cell Characteristics (Cycle Characteristics)>

An obtained all-solid-state secondary battery was subjected to 50 cycles of charging and discharging at 45° C. in which it was charged from 3 V to 4.2 V at 0.1C and then discharged from 4.2 V to 3 V at 0.1C. A value obtained by calculating the 0.1C discharge capacity of the $50^{th}$ cycle as a percentage relative to the 0.1C discharge capacity of the $1^{st}$ cycle was taken to be the capacity maintenance rate and was evaluated by the following standard. A larger value for the capacity maintenance rate indicates less reduction of discharge capacity and better cell characteristics (cycle characteristics).

A: Capacity maintenance rate of 90% or more
B: Capacity maintenance rate of not less than 80% and less than 90%
C: Capacity maintenance rate of not less than 70% and less than 80%
D: Capacity maintenance rate of less than 70%

<Solubility in Water of Compound>

Solubility in water at a temperature of 25° C. was measured for compounds used in the examples and comparative examples by the EPA method (EPA Chemical Fate Testing Guideline CG-1500 Water Solubility).

Example 1

<Production of Binder Composition>

A 1 L septum-equipped flask that included a stirrer was charged with 100 parts of deionized water and 0.2 parts of sodium dodecylbenzenesulfonate as an emulsifier, the gas phase was purged with nitrogen gas, and the temperature was raised to 60° C. Thereafter, 0.25 parts of ammonium persulfate (APS) as a polymerization initiator was dissolved in 20.0 parts of deionized water and was added into the flask.

Meanwhile, a monomer composition was obtained in a separate vessel by mixing 40 parts of deionized water, 1.0 parts of sodium lauryl sulfate as an emulsifier, 69 parts of n-butyl acrylate as a carbonyl group-containing monomer, 6 parts of acrylonitrile as a vinyl cyanide monomer, and 25 parts of styrene as an aromatic monomer.

The monomer composition was continuously added into the 1 L septum-equipped flask over 3 hours to perform polymerization. The reaction was carried out at a temperature of 60° C. during addition. Once the addition was complete, a further 3 hours of stirring was performed at a temperature of 80° C. to complete the reaction.

Next, an appropriate amount of diisobutyl ketone was added as an organic solvent to obtain a mixture. Thereafter, distillation was performed under reduced pressure at a temperature of 80° C. to remove water and excess diisobutyl ketone from the mixture, and thereby obtain a binder precursor composition (solid content concentration: 8%).

In addition, 5 parts of a first synthetic zeolite (produced by Shin-Etsu Kasei Kogyo Co., Ltd.; product name: Molecular Sieve 4A; form: powder; particle diameter: 325 mesh; solubility in water at temperature of 25° C.: less than 0.1%) was added to the obtained binder precursor composition as a compound including an element belonging to either or both of group 13 and group 14 of the periodic table. After 24 hours, filtration was performed using a 10 μm filter to yield a binder composition.

<Production of Slurry Composition for Positive Electrode Mixed Material Layer>

After mixing 70 parts of lithium cobalt oxide (number-average particle diameter: 11.5 μm) as a positive electrode active material, 25.5 parts of sulfide glass formed of $Li_2S$ and $P_2S_5$ ($Li_2S/P_2S_5$=70 mol %/30 mol %; number-average particle diameter: 0.9 μm) as a solid electrolyte, 2.5 parts of acetylene black as a conductive material, and 2 parts (in terms of solid content) of the binder composition obtained as described above and then further adding diisobutyl ketone as an organic solvent so as to adjust the solid content concentration to 80%, these materials were mixed for 60 minutes in a planetary mixer. Diisobutyl ketone was subsequently further added so as to adjust the solid content concentration to 70%, and then 10 minutes of mixing was performed to produce a slurry composition for a positive electrode mixed material layer.

<Production of Slurry Composition for Negative Electrode Mixed Material layer>

After mixing 60 parts of graphite (number-average particle diameter: 20 μm) as negative electrode active material particles, 36.5 parts of sulfide glass formed of $Li_2S$ and $P_2S_5$ ($Li_2S/P_2S_5$=70 mol %/30 mol %; number-average particle diameter: 0.9 μm) as solid electrolyte particles, 1.5 parts of acetylene black as conductive material particles, and 2 parts (in terms of solid content) of the binder composition obtained as described above and then further adding diisobutyl ketone as an organic solvent so as to adjust the solid content concentration to 65%, these materials were mixed for 60 minutes in a planetary mixer. Diisobutyl ketone was subsequently further added to adjust the solid content concentration to 60%, and then mixing was performed in the planetary mixer to produce a slurry composition for a negative electrode mixed material layer.

<Production of Slurry Composition for Solid Electrolyte Layer>

After mixing 100 parts of sulfide glass formed of $Li_2S$ and $P_2S_5$ ($_{Li2}S/P_2S_5$=70 mol %/30 mol %; number-average particle diameter: 0.9 μm) as solid electrolyte particles and 2 parts (in terms of solid content) of the binder composition obtained as described above and further adding diisobutyl ketone as an organic solvent so as to adjust the solid content concentration to 60% inside a glovebox (moisture concentration: 0.6 mass ppm; oxygen concentration: 1.8 mass ppm) under an argon gas atmosphere, these materials were mixed for 60 minutes in a planetary mixer. Diisobutyl ketone was subsequently further added to adjust the solid content concentration to 45%, and then mixing was performed in the planetary mixer to produce a slurry composition for a solid electrolyte layer. The obtained slurry composition for a solid electrolyte layer was used to perform various measurements. The results are shown in Table 1.

<Production of all-Solid-State Secondary Battery>

The slurry composition for a positive electrode mixed material layer was applied onto the surface of a current collector (aluminum foil; thickness: 20 μm) and was dried (60 minutes at temperature of 120° C.) so as to form a positive electrode mixed material layer (solid electrolyte-containing layer) of 50 μm in thickness, and thereby obtain a positive electrode. This positive electrode was used to measure positive electrode peel strength and pressability. The results are shown in Table 1.

The slurry composition for a negative electrode mixed material layer was applied onto the surface of a separate current collector (copper foil; thickness: 15 μm) and was dried (60 minutes at temperature of 120° C.) so as to form a negative electrode mixed material layer (solid electrolyte-containing layer) of 60 μm in thickness, and thereby obtain a negative electrode.

Next, the slurry composition for a solid electrolyte layer was applied onto imide film (thickness: 25 μm) and was dried (60 minutes at temperature of 120° C.) so as to form a solid electrolyte layer (solid electrolyte-containing layer) of 150 μm in thickness. Laminating was performed such that the positive electrode mixed material layer and the solid electrolyte layer were in contact, and then a pressing process was performed with a pressure (pressing pressure) of 400 MPa applied so as to transfer the solid electrolyte layer onto the positive electrode mixed material layer from the imide film, and thereby obtain a solid electrolyte layer-equipped positive electrode.

The solid electrolyte layer-equipped positive electrode and the negative electrode were laminated such that the solid electrolyte layer of the solid electrolyte layer-equipped positive electrode and the negative electrode mixed material layer of the negative electrode were in contact, and a pressing process was performed with a pressure (pressing pressure) of 400 MPa applied to the solid electrolyte layer (solid electrolyte-containing layer) of the solid electrolyte layer-equipped positive electrode so as to obtain an all-solid-state secondary battery. The thickness of the solid electrolyte layer in the all-solid-state secondary battery after pressing was 120 μm. This all-solid-state secondary battery was used to measure cell resistance and cell characteristics (cycle characteristics). The results are shown in Table 1.

Example 2

A binder composition, a slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 1 with the exception that 25 parts of phenoxyethyl acrylate as an ether group-containing monomer was used as a monomer instead of styrene as an aromatic monomer in production of the binder composition. The results are shown in Table 1.

(Examples 3 and 4)

A binder composition, a slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 1 with the exception that the amount of an element belonging to either or both of group 13 and group 14 of the periodic table relative to the polymer in the binder composition was adjusted to 4,300 mass ppm (Example 3) or 12 mass ppm (Example 4) in production of the binder composition. The results are shown in Table 1.

Example 5

A binder composition, a slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 1 with the exception that a second synthetic zeolite (produced by Shin-Etsu Kasei Kogyo Co., Ltd.; product name: Molecular Sieve 13X; form: powder; particle diameter: 325 mesh; solubility in water at temperature of 25° C.: 0.1%) was used instead of the first synthetic zeolite as a compound including an element belonging to either or both of group 13 and group 14 of the periodic table in production of the binder composition. The results are shown in Table 1.

Example 6

A binder composition, a slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 1 with the exception that a third synthetic zeolite (produced by Shin-Etsu Kasei Kogyo Co., Ltd.; product name: Molecular Sieve 3A; form: powder; particle diameter: 325 mesh; solubility in water at temperature of 25° C.: 0.2%) was used instead of the first synthetic zeolite as a compound including an element belonging to either or both of group 13 and group 14 of the periodic table in production of the binder composition. The results are shown in Table 1.

Example 7

A binder composition, a slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 1 with the exception that a fourth synthetic zeolite (produced by Zeochem; product name: ZEOflair 110; form: powder; particle diameter: 325 mesh; solubility in water at temperature of 25° C.: 0.1%) was used instead of the first synthetic zeolite as a compound including an element belonging to either or both of group 13 and group 14 of the periodic table in production of the binder composition. The results are shown in Table 1.

Example 8

A binder composition, a slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 1 with the exception that silica gel (produced by TOYOTAKAKO Co., Ltd.; product name: A-Type Silica Gel; solubility in water at temperature of 25° C.: 0.3%) was used instead of the first synthetic zeolite as a compound including an element belonging to either or both of group 13 and group 14 of the periodic table in production of the binder composition. The results are shown in Table 2

Example 9

A binder composition, a slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 1 with the exception that 71 parts of n-butyl acrylate as a carbonyl group-containing monomer, 3 parts of methacrylic acid as a carboxy group-containing monomer, 6 parts of acrylonitrile as a vinyl cyanide monomer, and 20 parts of styrene as an aromatic monomer were used in production of the binder composition. The results are shown in Table 2.

Example 10

A binder composition, a slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 9 with the exception that 2-hydroxyethyl acrylate as a hydroxy group-containing monomer was used instead of a carboxy group-containing monomer in production of the binder composition. The results are shown in Table 2.

Examples 11, 12, 16, and 17

A binder composition, a slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 1 with the exception that butyl butyrate (Example 11), mesitylene (Example 12), xylene (Example 16), or isobutyl isobutyrate (Example 17) was used instead of diisobutyl ketone as an organic solvent in production of the binder composition. The results are shown in Tables 2 and 3.

Example 13

A slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 1 with the exception that a binder composition produced as described below was used. The results are shown in Table 2.
<Production of Binder Composition>

A reactor was charged with 2 parts of potassium oleate as an emulsifier, 0.1 parts of potassium phosphate as a stabilizer, and 150 parts of water, and then 35 parts of n-butyl acrylate as a carbonyl group-containing monomer, 19 parts of acrylonitrile as a vinyl cyanide monomer, 31 parts of 1,3-butadiene as a conjugated diene monomer, 15 parts of styrene as an aromatic monomer, and 0.31 parts of t-dodecyl mercaptan as a molecular weight modifier were further added. Emulsion polymerization was initiated at a temperature of 10° C. in the presence of 0.015 parts of ferrous sulfate as an activator and 0.05 parts of paramenthane hydroperoxide as a polymerization initiator. At the point at which the polymerization conversion rate reached 85%, 0.2 parts of hydroxylamine sulfate was added per 100 parts of monomer to end polymerization.

Once polymerization had ended, heating was performed, unreacted monomer was collected through steam distillation under reduced pressure at a temperature of 70° C., and then 2 parts of an alkylated phenol was added as an antioxidant to yield a polymer (copolymer latex).
<<Hydrogenation Reaction>>

A 1 L autoclave equipped with a stirrer was charged with 400 mL of the obtained water dispersion of the polymer (total solid content: 48 g), and then nitrogen gas was passed for 10 minutes in order to remove dissolved oxygen in the polymer solution. Thereafter, 50 mg of palladium acetate was dissolved in 180 mL of water to which nitric acid had been added in an amount of 4 molar equivalents relative to the Pd and was then added into the autoclave as a hydrogenation reaction catalyst. Purging of the system with hydrogen gas was performed twice, and then the contents of the autoclave were heated to a temperature of 50° C. in a state in which the pressure was raised to 3 MPa with hydrogen gas, and a hydrogenation reaction was carried out for 6 hours.

The contents were restored to normal temperature, the system was converted to a nitrogen atmosphere, and then an evaporator was used to perform concentrating to a solid content concentration of 40%, and thereby yield a polymer (hydrogenated nitrile rubber).

After coagulating 100 g of the obtained polymer (hydrogenated nitrile rubber) in 1 L of methanol, 12 hours of vacuum drying was performed at a temperature of 60° C. The resultant dry polymer was analyzed by $^1$H-NMR. The proportional content (%) of each monomer unit and structural unit included in the polymer was calculated based on the obtained analysis values. The results are shown in Table 2.

Next, an appropriate amount of diisobutyl ketone was added to the obtained water dispersion of the polymer so as to obtain a mixture. Thereafter, distillation was performed under reduced pressure at a temperature of 80° C. to remove water and excess diisobutyl ketone from the mixture, and thereby obtain a binder precursor composition (solid content concentration: 8%).

In addition, 5 parts of the first synthetic zeolite (produced by Shin-Etsu Kasei Kogyo Co., Ltd.; product name: Molecular Sieve 4A; form: powder; particle diameter: 325 mesh; solubility in water at temperature of 25° C.: less than 0.1%) was added to the binder precursor composition as a compound including an element belonging to either or both of group 13 and group 14 of the periodic table. After 24 hours, filtration was performed using a 10 μm filter to yield a binder composition.

Example 14

A slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 1 with the exception that two types of polymers (polymers A and B in a mass ratio of 1:1) were used as polymers. The results are shown in Table 3. Note that the polymer A and the polymer B were produced as described below.
<Production of Diisobutyl Ketone Dispersion of Polymer A>

A 1 L septum-equipped flask that included a stirrer was charged with 100 parts of deionized water, the gas phase was purged with nitrogen gas, and the temperature was raised to 70° C. Thereafter, 0.5 parts of ammonium persulfate (APS) as a polymerization initiator was dissolved in 20.0 parts of deionized water and was added into the flask.

Meanwhile, a monomer composition was obtained in a separate vessel by mixing 40 parts of deionized water, 1.0 parts of sodium dodecylbenzenesulfonate as an emulsifier, 50 parts of n-butyl acrylate and 20 parts of ethyl acrylate as carbonyl group-containing monomers, 10 parts of acrylonitrile as a vinyl cyanide monomer, and 20 parts of styrene as an aromatic vinyl monomer.

The obtained monomer composition was continuously added into the 1 L septum-equipped flask over 2 hours to perform polymerization. A reaction temperature of 70° C. was maintained during addition of the monomer composition. After addition of the monomer composition, a further 3 hours of stirring was performed at a temperature of 80° C., and then the polymerization was ended.

Next, an appropriate amount of diisobutyl ketone was added as an organic solvent to the resultant water dispersion of a polymer A so as to obtain a mixture.

Thereafter, distillation was performed under reduced pressure at a temperature of 80° C. to remove water and excess diisobutyl ketone from the mixture, and thereby obtain a diisobutyl ketone dispersion of the polymer A (solid content concentration: 8%).

<Production of Diisobutyl Ketone Dispersion of Polymer B>

A 1 L septum-equipped flask that included a stirrer was charged with 100 parts of deionized water, the gas phase was purged with nitrogen gas, and the temperature was raised to 70° C. Thereafter, 0.5 parts of ammonium persulfate (APS) as a polymerization initiator was dissolved in 20.0 parts of deionized water and was added into the flask.

Meanwhile, a monomer composition was obtained in a separate vessel by mixing 40 parts of deionized water, 1.0 parts of sodium dodecylbenzenesulfonate as an emulsifier, 54.5 parts of n-butyl acrylate and 25 parts of ethyl acrylate as carbonyl group-containing monomers, 10 parts of acrylonitrile as a vinyl cyanide monomer, 10 parts of styrene as an aromatic monomer, and 0.5 parts of allyl methacrylate as another monomer.

The obtained monomer composition was continuously added into the 1 L septum-equipped flask over 2 hours to perform polymerization. A reaction temperature of 70° C. was maintained during addition of the monomer composition. After addition of the monomer composition, a further 3 hours of stirring was performed at a temperature of 80° C., and then the polymerization was ended.

Next, an appropriate amount of diisobutyl ketone was added as an organic solvent to the resultant water dispersion of a polymer B so as to obtain a mixture.

Thereafter, distillation was performed under reduced pressure at a temperature of 80° C. to remove water and excess diisobutyl ketone from the mixture, and thereby obtain a diisobutyl ketone dispersion of the polymer B (solid content concentration: 8%).

<Production of Binder Composition Containing Polymer A and Polymer B>

A binder composition was produced by mixing the diisobutyl ketone dispersion of the polymer A and the diisobutyl ketone solution of the polymer B that were obtained as described above such that the quantitative ratio thereof (in terms of solid content) was polymer A:polymer B=1:1.

Example 15

A binder composition, a slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 1 with the exception that 52 parts of n-butyl acrylate and 42 parts of ethyl acrylate as carbonyl group-containing monomers, 3 parts of methacrylic acid as a carboxy group-containing monomer, and 3 parts of 2-hydroxyethyl acrylate as a hydroxy group-containing monomer were used in production of the binder composition. The results are shown in Table 3.

Example 18

A binder composition, a slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 16 with the exception that 65 parts of n-butyl acrylate and 25 parts of ethyl acrylate as carbonyl group-containing monomers and 10 parts of acrylonitrile as a vinyl cyanide monomer were used in production of the binder composition. The results are shown in Table 3.

Comparative Example 1

A binder composition, a slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 1 with the exception that a compound including an element belonging to either or both of group 13 and group 14 of the periodic table was not used in production of the binder composition. The results are shown in Table 4.

Comparative Example 2

A binder composition, a slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 1 with the exception that the content of an element belonging to either or both of group 13 and group 14 of the periodic table in the binder composition was adjusted to 10,000 mass ppm in production of the binder composition. The results are shown in Table 4.

Comparative Example 3

A binder composition, a slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 1 with the exception that sodium hydroxide was used in production of the polymer such that Na was contained in the binder composition instead of an element belonging to either or both of group 13 and group 14 of the periodic table. The results are shown in Table 4.

Comparative Example 4

A binder composition, a slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 1 with the exception that sodium hydroxide and calcium hydroxide were used in production of the polymer such that Na and Ca were contained in the binder composition instead of an element belonging to either or both of group 13 and group 14 of the periodic table. The results are shown in Table 4.

In Tables 1 to 4, shown below:
"BA" indicates n-butyl acrylate unit;
"PEA" indicates phenoxyethyl acrylate unit;
"EA" indicates ethyl acrylate unit;
"MAA" indicates methacrylic acid unit;
"B-HEA" indicates 2-hydroxyethyl acrylate unit;
"AN" indicates acrylonitrile unit;
"ST" indicates styrene unit;
"H-BD" indicates hydrogenated 1,3-butadiene unit;
"AMA" indicates allyl methacrylate unit;
"DIK" indicates diisobutyl ketone;
"HB" indicates butyl butyrate; and
"MES" indicates mesitylene.

TABLE 1

| | | | | Example 1 | Example 2 | Example 3 | Example 4 | Example 5 | Example 6 | Example 7 |
|---|---|---|---|---|---|---|---|---|---|---|
| Shiny composition | Binder composition | Polymer | Chemical composition | Functional group of polymer | | | | | | |
| | | | | Carbonyl group-containing monomer unit Type | Carbonyl group | Carbonyl group | Carbonyl group | Carbonyl group | Carbonyl group | Carbonyl group | Carbonyl group |
| | | | | Proportion [mass %] Type | BA | BA | BA | BA | BA | BA | BA |
| | | | | | 69 | 69 | 69 | 69 | 69 | 69 | 69 |
| | | | | Ether group-containing monomer unit Type | — | Ether group | — | — | — | — | — |
| | | | | Proportion [mass %] | — | PEA | — | — | — | — | — |
| | | | | | — | 25 | — | — | — | — | — |
| | | | | Carboxy group-containing monomer unit Type | — | — | — | — | — | — | — |
| | | | | Proportion [mass %] | — | — | — | — | — | — | — |
| | | | | Hydroxy group-containing monomer unit Type | — | — | — | — | — | — | — |
| | | | | Proportion [mass %] | — | — | — | — | — | — | — |
| | | | | Vinyl cyanide monomer unit Type | AN | AN | AN | AN | AN | AN | AN |
| | | | | Proportion [mass %] | 6 | 6 | 6 | 6 | 6 | 6 | 6 |
| | | | | Aromatic monomer unit Type | ST | — | ST | ST | ST | ST | ST |
| | | | | Proportion [mass %] | 25 | — | 25 | 25 | 25 | 25 | 25 |
| | | | | Conjugated diene monomer unit/Alkylene structural unit Type | — | — | — | — | — | — | — |
| | | | | Proportion [mass %] | — | — | — | — | — | — | — |
| | | | | Other structural unit Type | — | — | — | — | — | — | — |
| | | | | Proportion [mass %] | — | — | — | — | — | — | — |
| | | | Organic solvent Type | | DIK | DIK | DIK | DIK | DIK | DIK | DIK |
| | | | Compound including element belonging to group 13 and/or 14 of periodic table | Group of periodic table | Groups 13 and 14 | Groups 13 and 14 | Groups 13 and 14 | Groups 13 and 14 | Groups 13 and 14 | Groups 13 and 14 | Groups 13 and 14 |
| | | | | Type | First synthetic zeolite | First synthetic zeolite | First synthetic zeolite | First synthetic zeolite | Second synthetic zeolite | Third synthetic zeolite | Fourth synthetic zeolite |
| | | | Element other than element belonging to group 13 and/or 14 of periodic table | Group of periodic table | — | — | — | — | — | — | — |
| | | | | Type | — | — | — | — | — | — | — |
| | | | Content of element belonging to group 13 and/or 14 of periodic table relative to polymer [ppm] | | 1000 | 1000 | 4300 | 12 | 800 | 2000 | 1500 |
| | | | Content of element other than element belonging to group 13 and/or 14 of periodic table relative to polymer [ppm] | | — | — | — | — | — | — | — |
| | Solid electrolyte | | | Type | $Li_2S/P_2S_5$ = 70 mol:30 mol | $Li_2S/P_2S_5$ = 70 mol:30 mol | $Li_2S/P_2S_5$ = 70 mol:30 mol | $Li_2S/P_2S_5$ = 70 mol:30 mol | $Li_2S/P_2S_5$ = 70 mol:30 mol | $Li_2S/P_2S_5$ = 70 mol:30 mol | $Li_2S/P_2S_5$ = 70 mol:30 mol |
| Evaluation | | | Dispersibility | | A | B | B | A | A | A | A |
| | | | Ion conductivity | | A | A | A | B | A | A | A |
| | | | Peel strength of positive electrode | | A | A | A | A | A | A | A |
| | | | Cell resistance | | A | A | B | B | A | A | A |
| | | | Pressability | | A | A | A | A | A | A | A |
| | | | Cell characteristics (cycle characteristics) | | A | A | A | B | A | A | A |

TABLE 2

| | | | | Example 8 | Example 9 | Example 10 | Example 11 | Example 12 | Example 13 |
|---|---|---|---|---|---|---|---|---|---|
| Slurry composition | Binder composition | Polymer | Functional group of polymer | Carbonyl group | Carbonyl group Carboxy group | Carbonyl group Hydroxy group | Carbonyl group | Carbonyl group | Carbonyl group |
| | | Chemical composition | Carbonyl group-containing monomer unit Type | BA | BA | BA | BA | BA | BA |
| | | | Proportion [mass %] | 69 | 71 | 71 | 69 | 69 | 30 |
| | | | Ether group-containing monomer unit Type | — | — | — | — | — | — |
| | | | Proportion [mass %] | — | — | — | — | — | — |
| | | | Carboxy group-containing monomer unit Type | — | MAA | — | — | — | — |
| | | | Proportion [mass %] | — | 3 | — | — | — | — |
| | | | Hydroxy group-containing monomer unit Type | — | — | BHEA | — | — | — |
| | | | Proportion [mass %] | — | — | 3 | — | — | — |
| | | | Vinyl cyanide monomer unit Type | AN | AN | AN | AN | AN | AN |
| | | | Proportion [mass %] | 6 | 6 | 6 | 6 | 6 | 18 |
| | | | Aromatic monomer unit Type | ST | ST | ST | ST | ST | ST |
| | | | Proportion [mass %] | 25 | 20 | 20 | 25 | 25 | 12 |
| | | | Conjugated diene monomer unit/Alkylene structural unit Type | — | — | — | — | — | H-BD |
| | | | Proportion [mass %] | — | — | — | — | — | 40 |
| | | | Other structural unit Type | — | — | — | — | — | — |
| | | | Proportion [mass %] | — | — | — | — | — | — |
| | | Organic solvent Type | | DIK | DIK | DIK | HB | MES | DIK |
| | | Compound including element belonging to group 13 and/or 14 of periodic table Type | | Group 14 Silica gel | Groups 13 and 14 First synthetic zeolite | Groups 13 and 14 First synthetic zeolite | Groups 13 and 14 First synthetic zeolite | Groups 13 and 14 First synthetic zeolite | Groups 13 and 14 First synthetic zeolite |
| | | Element other than element belonging to group 13 and/or 14 of periodic table | Group of periodic table | — | — | — | — | — | — |
| | | Content of element belonging to group 13 and/or 14 of periodic table relative to polymer [ppm] | | 8 | 1200 | 800 | 1000 | 1000 | 1000 |
| | | Content of element other than element belonging to group 13 and/or 14 of periodic table relative to polymer [ppm] | | — | — | — | — | — | — |
| | Solid electrolyte | | Type | Li$_2$S/P$_2$S$_5$ = 70 mol:30 mol | Li$_2$S/P$_2$S$_5$ = 70 mol:30 mol | Li$_2$S/P$_2$S$_5$ = 70 mol:30 mol | Li$_2$S/P$_2$S$_5$ = 70 mol:30 mol | Li$_2$S/P$_2$S$_5$ = 70 mol:30 mol | Li$_2$S/P$_2$S$_5$ = 70 mol:30 mol |
| Evaluation | Dispersibility | | | A | A | A | A | A | A |
| | Ion conductivity | | | B | A | A | B | A | B |
| | Peel strength of positive electrode | | | A | A | A | A | A | B |
| | Cell resistance | | | B | A | A | B | A | A |
| | Pressability | | | B | A | A | A | A | A |
| | Cell characteristics (cycle characteristics) | | | B | A | A | B | A | B |

TABLE 3

| | | | | Example 14 | Example 15 | Example 16 | Example 17 | Example 18 |
|---|---|---|---|---|---|---|---|---|
| Slurry composition | Binder composition | Polymer | Chemical composition | | | | | |
| | | | Functional group of polymer | Carbonyl group | Carbonyl group | Carbonyl group | Carbonyl group | Carbonyl group |
| | | | Carbonyl group-containing monomer unit Type | BA/EA | BA/EA | BA | BA | BA/EA |
| | | | Proportion [mass %] | 50/20 | 54.5/25 | 52/42 | 69 | 69 | 65/25 |
| | | | Ether group-containing monomer unit Type | — | — | — | — | — |
| | | | Proportion [mass %] | — | — | — | — | — |
| | | | Carboxy group-containing monomer unit Type | — | — | MAA | — | — | — |
| | | | Proportion [mass %] | — | — | 3 | — | — |
| | | | Hydroxy group-containing monomer unit Type | — | — | BHEA | — | — |
| | | | Proportion [mass %] | — | — | 3 | — | — |
| | | | Vinyl cyanide monomer unit Type | AN | AN | — | AN | AN | AN |
| | | | Proportion [mass %] | 10 | 10 | — | 6 | 6 | 10 |
| | | | Aromatic monomer unit Type | ST | ST | — | ST | ST | — |
| | | | Proportion [mass %] | 20 | 10 | — | 25 | 25 | — |
| | | | Conjugated diene monomer unit/Alkylene structural unit Type | — | — | — | — | — |
| | | | Proportion [mass %] | — | — | — | — | — |
| | | | Other structural unit Type | — | AMA | — | — | — |
| | | | Proportion [mass %] | — | 0.5 | — | — | — |
| | | Organic solvent Type | | DIK | DIK | DIK | Xylene | Isobutyl isobutyrate | Xylene |
| | | Compound including element belonging to group 13 and/or 14 of periodic table | | Groups 13 and 14 First synthetic zeolite | Groups 13 and 14 First synthetic zeolite | Groups 13 and 14 First synthetic zeolite | Groups 13 and 14 First synthetic zeolite | Groups 13 and 14 First synthetic zeolite | Groups 13 and 14 First synthetic zeolite |
| | | Element other than element belonging to group 13 and/or 14 of periodic table Type | | — | — | — | — | — |
| | | Content of element belonging to group 13 and/or 14 of periodic table relative to polymer [ppm] | | 1600 | 900 | 1000 | 1000 | 1000 |
| | | Content of element other than element belonging to group 13 and/or 14 of periodic table relative to polymer [ppm] | | — | — | — | — | — |
| | Solid electrolyte Type | | | $Li_2S/P_2S_5$ = 70 mol:30 mol | $Li_2S/P_2S_5$ = 70 mol:30 mol | $Li_2S/P_2S_5$ = 70 mol:30 mol | $Li_2S/P_2S_5$ = 70 mol:30 mol | $Li_2S/P_2S_5$ = 70 mol:30 mol |
| Evaluation | Dispersibility | | | A | B | A | A | A |
| | Ion conductivity | | | A | A | A | A | A |
| | Peel strength of positive electrode | | | A+ | B | A | A | A |
| | Cell resistance | | | A | B | A | A | A |
| | Pressability | | | A | A | A | A | A |
| | Cell characteristics (cycle characteristics) | | | A | B | A | A | A |

TABLE 4

|  |  |  |  |  | Comparative Example 1 | Comparative Example 2 | Comparative Example 3 | Comparative Example 4 |
|---|---|---|---|---|---|---|---|---|
| Shiny coirpo-sition | Binder compo-sition | Polymer | Functional group of polymer | | Carbonyl group | Carbonyl group | Carbonyl group | Carbonyl group |
| | | Chemical composition | Carbonyl group-containing monomer unit | Type | BA | BA | BA | BA |
| | | | | Proportion [mass %] | 69 | 69 | 69 | 69 |
| | | | Ether group-containing monomer unit | Type | — | — | — | — |
| | | | | Proportion [mass %] | — | — | — | — |
| | | | Carboxy group-containing monomer unit | Type | — | — | — | — |
| | | | | Proportion [mass %] | — | — | — | — |
| | | | Hydroxy group-containing monomer unit | Type | — | — | — | — |
| | | | | Proportion [mass %] | — | — | — | — |
| | | | Vinyl cyanide monomer unit | Type | AN | AN | AN | AN |
| | | | | Proportion [mass %] | 6 | 6 | 6 | 6 |
| | | | Aromatic monomer unit | Type | ST | ST | ST | ST |
| | | | | Proportion [mass %] | 25 | 25 | 25 | 25 |
| | | | Conjugated diene monomer unit/Alkylene structural unit | Type | — | — | — | — |
| | | | | Proportion [mass %] | — | — | — | — |
| | | | Other structural unit | Type | — | — | — | — |
| | | | | Proportion [mass %] | — | — | — | — |
| | | Organic solvent | | Type | DIK | DIK | DIK | DIK |
| | | Compound including element belonging to group 13 and/or 14 of periodic table | | Group of periodic table | — | Groups 13 and 14 | — | — |
| | | | | Type | — | First synthetic zeolite | — | — |
| | | Element other than element belonging to group 13 and/or 14 of periodic table | | Group of periodic table | — | — | Group 1 | Groups 1 and 2 |
| | | | | Type | — | — | Na | Na, Ca |
| | | Content of element belonging to group 13 and/or 14 of periodic table relative to polymer [ppm] | | | 0 | 10000 | — | — |
| | | Content of element other than element belonging to group 13 and/or 14 of periodic table relative to polymer [ppm] | | | — | — | 1500 | Na: 1500 Ca: 1000 |
| | | Solid electrolyte | | Type | $Li_2S/P_2S_5$ = 70 mol:30 mol | $Li_2S/P_2S_5$ = 70 mol:30 mol | $Li_2S/P_2S_5$ = 70 mol:30 mol | $Li_2S/P_2S_5$ = 70 mol:30 mol |
| Evalu-ation | | Dispersibility | | | D | D | C | C |
| | | Ion conductivity | | | D | C | C | C |
| | | Peel strength of positive electrode | | | D | D | C | C |
| | | Cell resistance | | | C | D | C | C |
| | | Pressability | | | D | C | D | D |
| | | Cell characteristics (cycle characteristics) | | | D | D | C | C |

It can be seen from Tables 1 to 3 that it is possible to produce an all-solid-state secondary battery having excellent water resistance while also having excellent battery characteristics by using a binder composition that contains a polymer, an organic solvent, and a compound having a solubility of 10 mass % or less in water at a temperature of 25° C. and including an element belonging to either or both of group 13 and group 14 of the periodic table (excluding carbon and germanium) and in which the content of the element is not less than 5 mass ppm and not more than 5,000 mass ppm relative to the polymer (Examples 1 to 18).

In contrast, it can be seen that an obtained all-solid-state secondary battery has poor water resistance and battery characteristics compared to the all-solid-state secondary batteries obtained in the examples when using a binder composition that does not contain the aforementioned compound (Comparative Example 1), a binder composition in which the content of an element belonging to either or both of group 13 and group 14 of the periodic table relative to a polymer is outside of the aforementioned range (Comparative Example 2), or a binder composition that does not contain an element belonging to either or both of group 13 and group 14 of the periodic table (Comparative Examples 3 and 4).

INDUSTRIAL APPLICABILITY

According to the present disclosure, it is possible to provide a binder composition for a secondary battery that can improve water resistance of a secondary battery and can cause a secondary battery to display excellent battery characteristics.

Moreover, according to the present disclosure, it is possible to provide a slurry composition for a secondary battery that can improve water resistance of a secondary battery and can cause a secondary battery to display excellent battery characteristics.

Furthermore, according to the present disclosure, it is possible to provide a solid electrolyte-containing layer that has excellent water resistance, an all-solid-state secondary battery that has excellent battery characteristics, and a method of producing this all-solid-state secondary battery.

The invention claimed is:

1. A binder composition for a secondary battery comprising:
   a polymer;
   an organic solvent; and
   a compound formed of an organic material or an inorganic material, wherein
   the compound has a solubility of 10 mass % or less in water at a temperature of 25° C. and includes an element belonging to either or both of group 13 and group 14 of the periodic table, excluding carbon and germanium,
   content of the element in the binder composition for a secondary battery is not less than 5 mass ppm and not more than 5,000 mass ppm relative to the polymer;
   the compound includes at least one compound selected from a group consisting of zeolites, silica gel, polydimethylsiloxane.

2. The binder composition for a secondary battery according to claim 1, wherein the polymer includes one or more functional groups selected from the group consisting of a carbonyl group, an ether group, a carboxy group, and a hydroxy group.

3. The binder composition for a secondary battery according to claim 1, wherein the polymer includes a vinyl cyanide monomer unit in a proportion of not less than 2 mass % and not more than 35 mass %.

4. The binder composition for a secondary battery according to claim 1, wherein the polymer includes an aromatic monomer unit in a proportion of not less than 5 mass % and not more than 40 mass %.

5. The binder composition for a secondary battery according to claim 1, wherein the polymer includes either or both of a conjugated diene monomer unit and an alkylene structural unit in a proportion of not less than 20 mass % and not more than 60 mass %.

6. A slurry composition for a secondary battery comprising the binder composition for a secondary battery according to claim 1.

7. The slurry composition for a secondary battery according to claim 6, comprising a solid electrolyte.

8. A solid electrolyte-containing layer obtained using the slurry composition for a secondary battery according to claim 7.

9. An all-solid-state secondary battery comprising the solid electrolyte-containing layer according to claim 8.

10. A method of producing an all-solid-state secondary battery comprising a step of pressing the solid electrolyte-containing layer according to claim 9 with a pressure of less than 300 MPa.

* * * * *